Feb. 19, 1957  R. MILIK  2,781,893
TROUGHING CONVEYOR BELT APPARATUS
Filed June 12, 1953
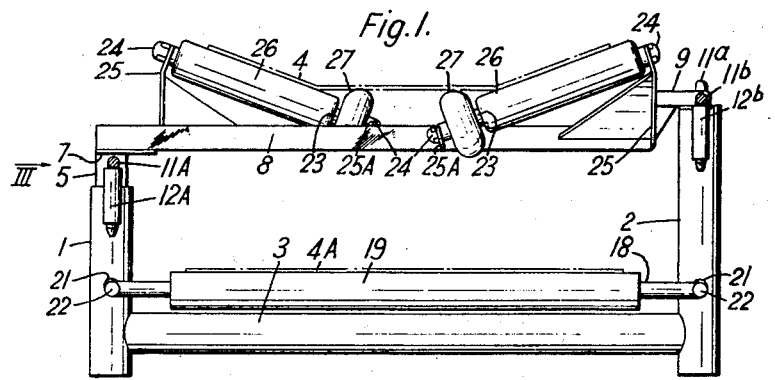
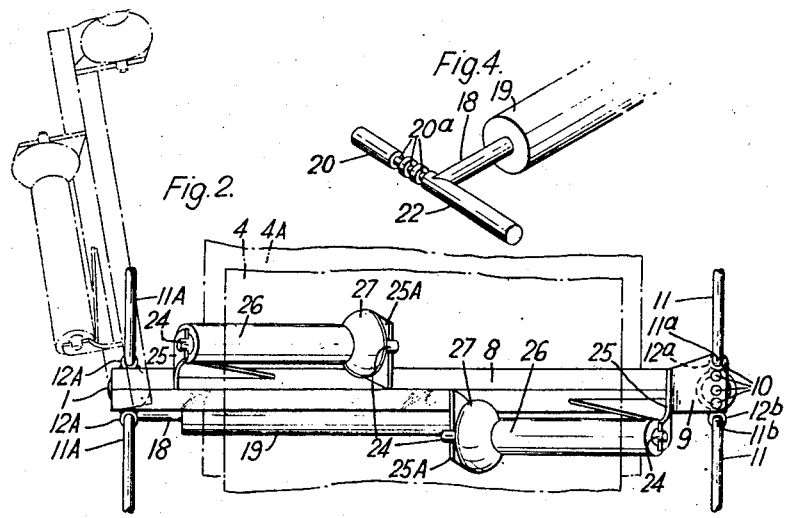
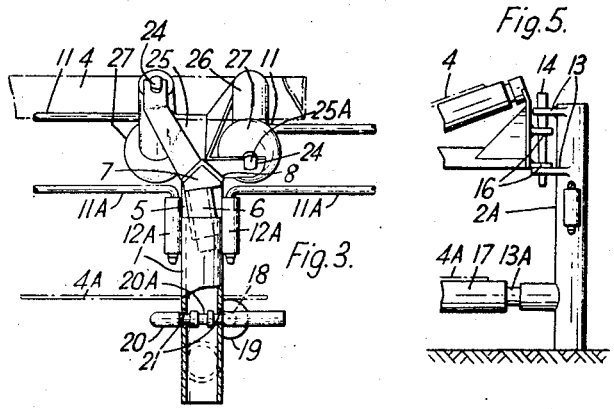
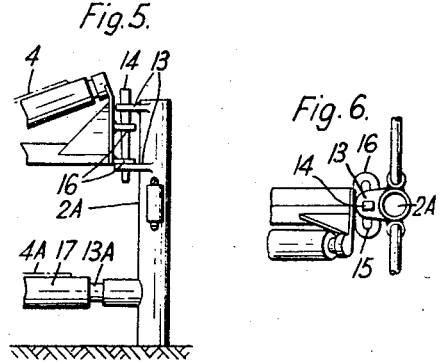
Inventor
RUDOLF MILIK
By
Attorneys

United States Patent Office 2,781,893
Patented Feb. 19, 1957

2,781,893

TROUGHING CONVEYOR BELT APPARATUS

Rudolf Milik, Greenock, Renfrew, Scotland, assignor to Milik Conveyors Limited, London, England, a British company Application June 12, 1953, Serial No. 361,355

Claims priority, application Great Britain June 20, 1952

8 Claims. (Cl. 198—192)

This invention relates to apparatus for supporting a travelling endless conveyor belt at intervals along its path of travel.

The present invention has particular reference to apparatus for this purpose which comprises a series of belt-supporting units each having a set of rollers constituting a transverse support for the belt and mounted on a transversely extending arm which is hinged at one end to a side support situated near one edge of the belt, in such manner that the arm and its set of rollers can be swung into and out of the transverse supporting position, whether or not the belt is in motion, about an axis slightly tilted from the vertical in a direction such that as the arm is swung its outward movement to the non-supporting position is also a slightly downward movement, and vice versa.

The main object of this invention is to provide an improved belt supporting unit of the general form to which particular reference is made above, this improved unit being primarily but not exclusively intended for use in mines where pit props are not available to provide the side supports above mentioned.

Another object of this invention is to provide means whereby a series of in-line belt supporting units can be readily interconnected to form a continuous installation.

Hitherto it has been customary to support a transversely troughed belt by means of at least three cylindrical rollers, one central and horizontally disposed roller and two cylindrical rollers situated one at each end of the central roller and upwardly inclined from the axis thereof.

A further object of this invention is to provide improved means for supporting a transversely troughed conveyor belt and with the foregoing objects in view the invention, according to another aspect thereof comprises a rigid framework adapted to be moved into and out of the working position beneath the runs of the conveyor belt and means mounted on said framework for supporting the upper run of the belt, said means comprising two inclined shafts mounted in shallow V formation, each shaft carrying or constituting a plain cylinder for supporting an inclined side portion of the troughed belt run and one or more independently revoluble discs on the lower end of the shaft, the discs on the two shafts providing support for the middle horizontal portion of said belt run at laterally spaced points, leaving a longitudinal central zone without underneath support.

In the accompanying drawings Figures 1, 2, 3 and 4 illustrate, by way of example, an embodiment of the invention, Figure 1 being a front elevation of a belt supporting unit, Figure 2 a plan view of the unit, and Figure 3 an end view looking in the direction of arrow III, Figure 1. Figure 4 is a perspective view of one end of a mounting for a roller for supporting the lower run of the belt. Figures 5 and 6 are respectively fragmentary front elevation and plan view of a modification.

In the embodiment illustrated in Figures 1, 2 and 3 two upright tubular posts 1, 2 are interconnected by a cross member 3 arranged toward the bottom of the posts, said posts being adapted to stand adjacent opposite edges of upper and lower runs 4, 4A respectively of an endless conveyor belt, such as employed in coal mines.

The post 1 has welded or otherwise secured to its upper end an upwardly extending socket tube 5 (Fig. 3) which is inclined from the vertical in the same direction or in the opposite direction to that of the travel of the belt. The socket tube 5 is adapted to receive for free turning therein a hinge pin 6 depending from a block 7 fixed to one end of an arm 8 which conveniently consists of a length of angle iron disposed with its section in inverted V form. This arm 8 carries freely revoluble belt supporting means hereinafter described.

The other post 2, situated on the other side of the belt, is provided with means for fastening the arm 8 after swinging adjustment in a horizontal plane.

These arm adjustment means may consist of a stiff plate 9 welded or otherwise secured to the other end of arm 8 said plate 9 having therein a series of holes 10 (Fig. 2) within any one of which may be engaged the downwardly bent or crank end 11a of a longitudinal connecting rod 11, which is one of the elements provided for connecting the unit shown to another which precedes it in the direction of travel of the upper run 4 of the belt. The rod end 11a passes through the selected hole 10 in plate 9 to engage within a socket tube 12a welded or otherwise secured to one side of the post 2. A similar socket tube 12b on the other side of post 2 is shown as engaged only and directly by the cranked end 11b of a similar connecting rod 11, which connects the unit shown to another which follows it in the direction of travel of belt run 4. The cranked end 11a by passing through any other hole 10 in plate 9 into the tube 12a serves to secure the arm 8 to the post 2, in a selected adjusted position relative to the normal right angular position with respect to the run of the belt, as shown.

A similar number of adjustments of the transverse position of arm 8 can be made by passing the cranked end 11b of the next rod 11 through any of the holes 10 to engage within tube 12b. Equivalent connecting rods 11A extend between and thus link together successive units on the opposite side of the belt, the rods 11A having cranked ends for directly engaging socket tubes 12A on the posts 1 of adjacent units.

Alternatively, as illustrated in Figures 5 and 6, the arm adjustment means may comprise a pair of lugs 13 vertically spaced on the post 2A and projecting toward the post 1 and a pin 14 which passes through holes in said lugs 13 and in extending therebetween, wedgingly engages within slots 15 formed in horizontally flat plates 16 welded or otherwise secured to the adjacent end of the arm 8. The slots 15 may be of arcuate form each having the centre of its radius of curvature coincident with the pin 6 on the other end of said arm 8, or may be wide enough to ensure that the pin extending between the lugs of the second mentioned post does not interfere with free swinging of the arm about the pin of the first mentioned post; in the latter case some means would be required to secure the pin 14 in the adjusted position. The length of each slot in the arm plates 16 is preferably such as to allow swinging adjustment of the arm 8 on its hinge to an extent of up to 5° on each side of the lug-supported pin 14 of post 2.

The post 1 is shorter than post 2 so that the coacting hinge pin 6 and its socket tube 5 upstands from the upper end of post 1 and the amount of inclination of said pin and tube may be such that the arm 8 can be swung out from under the belt to a position up to 10° or more away from the side edge of the belt—that is, 100° or more from its belt supporting position—so that the arm 8 and the supporting rollers thereon are readily and safely accessible for maintenance purposes even while the belt is still running.

The cross member which rigidly interconnects the two posts of a unit transversely may, as shown in Figure 5, be in the form of an axle 13A for a freely revoluble, long cylindrical roller 17 provided for supporting the flat lower or return run 4A of the belt, or in the form of a rigid non-rotatable cylindrical member.

It will not generally be necessary to afford support on every unit for the lower run 4A of the belt—for instance, each support at each alternate unit may suffice—and it is therefore preferable to use detachable lower run rollers, as shown in Figures 1, 3 and 4. In the detachable mounting illustrated each end of the axle 18 for the lower run roller 19 is provided with a right-angular extension 20 (Fig. 4) having a number of circumferential grooves 20a which when the extension is passed through aligned holes 21 in the post (both posts 1 and 2 have these holes 21) allows the wall of the post to be received within two of the grooves thereby holding the extension against endwise movement. Axially aligned with the extensions 20 are hand grips 22 to facilitate the mounting and removal of the rollers 19 and their axles 18.

The improved roller support according to this invention dispenses with the central roller customarily employed and provides two shafts 23 freely revolubly mounted in cap housings 24 detachably carried on brackets 25, 25A fixed on the arm in inclined positions, as in the manner normally adopted with inclined rollers. On the upper portions of said shafts 23, either freely revoluble or secured to said shafts, are plain cylindrical rollers 26 suitable for supporting the inclined portions of the troughed belt. For supporting the central portion of the belt each shaft 23 carries one or more freely revoluble round-edged discs 27, preferably rubber-edged the effective diameters of said discs being so determined in relation to the positions of the discs along the axle as to provide same-level support for the flat central portion of the belt.

The elimination of the central roller customarily employed, or equivalent supporting means, such as flat rimmed discs extending from one side roller to the other not only reduces the number of bearings required but provides a middle gap between the discs 27 whereat the belt is without underneath support. There is thus a longitudinal central zone of the middle part of the belt in which there are no rollers between which, in a longitudinal direction, the belt dips. Moreover, if, as preferred, the discs 27 are made of rubber there is less impact of load against the belt supporting means, and the impact is reduced to a minimum where the load is at a maximum, that is, at the middle of width of the belt run. The gap between discs 27 also helps the belt run to be self-centering.

I claim:

1. A unit for supporting a transversely troughed endless conveyor belt comprising a rigid framework constituted by two upright posts adapted to stand adjacent opposite edges of the vertically aligned upper and lower runs of said belt and a cross member arranged toward the bottom of and interconnecting said posts; hinge means comprising a socket element and a pin element, one of which upwardly extends from one of said posts, said hinge element being inclined to the vertical in the direction of the run of the belt; an arm carrying two inclined shafts mounted in shallow V formation, a plain cylinder freely revoluble on each shaft for supporting one of the inclined side portions of the upper run of said belt and at the inner end of each shaft a freely revoluble disc-like roller larger in diameter than the associated cylinder to provide laterally spaced transversely offset points of support for the middle portion of said troughed belt run, said arm being hingedly mounted by one end on said hinge element on one post, and temporarily supported at the end remote from the axis of hinging on said other post, so that the arm and belt supporting means thereon can be swung as a unit to and from beneath the belt with a slightly downward movement to clear the underside of the troughed belt run.

2. A belt-supporting unit as claimed in claim 1, having means for adjustably attaching the other end of said arm to said other post in a longitudinal direction.

3. A belt-supporting unit as claimed in claim 1, wherein a supporting roller for the transversely flat lower run of the belt is mounted on and extends between the cross connected posts.

4. A belt-supporting unit as claimed in claim 3, characterised in that a separate axle with the lower run roller thereon is detachably mounted on and between the posts.

5. An installation for supporting an endless conveyor belt, comprising a series of units as claimed in claim 1, said units being interconnected by longitudinal rod members.

6. An installation as claimed in claim 5, characterised in that a pair of rod members interconnecting adjacent units serve also for the purpose of adjusting the arm in relation to the direction of run of the belt.

7. A unit for supporting a transversely troughed endless conveyor belt comprising a rigid framework constituted by two cross-connected upright posts erectable on opposite sides of the belt by swinging the framework up beneath a run of the belt, and an arm carrying two inclined shafts mounted in shallow V formation, the lower end of each shaft revolubly supporting one of two laterally spaced disc-like rollers affording support at opposite longitudinal sides of a middle zone of the belt, leaving the remainder of said zone without underneath support, plain cylindrical rollers being aligned one on each shaft with said disc-like rollers to afford support to the inclined side portions of the belt.

8. An installation for supporting an endless conveyor belt having a transversely troughed run, comprising a series of units strung together in-line by longitudinal connecting rods, each of said units comprising a rigid framework adapted to be erected to dispose two cross-connected upright posts one each on opposite sides of the belt and an arm hinged to one post about an inclined axis to admit of it clearing the underside of the transversely troughed belt, said arm carrying freely revoluble belt-supporting elements constituted by plain cylindrical rollers for supporting inclined side portions of said troughed belt run and inwardly disposed rounded-contour disc-like rollers affording laterally spaced support to marginal parts of a longitudinal middle zone of the belt.

References Cited in the file of this patent

UNITED STATES PATENTS

| | | |
|---|---|---|
| 1,833,179 | Robins | Nov. 24, 1931 |
| 2,052,900 | Searles et al. | Sept. 1, 1936 |
| 2,514,715 | Milik | July 11, 1950 |

FOREIGN PATENTS

| | | |
|---|---|---|
| 590,008 | Great Britain | July 7, 1947 |